United States Patent [19]

Neuman

[11] Patent Number: 4,527,692
[45] Date of Patent: Jul. 9, 1985

[54] DISK STORAGE AND DISPLAY CONTAINER

[75] Inventor: Eli Neuman, Woodland Hills, Calif.

[73] Assignee: PerfectData Corporation, Chatsworth, Calif.

[21] Appl. No.: 565,591

[22] Filed: Dec. 27, 1983

[51] Int. Cl.³ ............................................. B65D 85/30
[52] U.S. Cl. ..................... 206/444; 206/45.15; 206/45; 206/45.16; 206/45.18; 206/45.19
[58] Field of Search ...................... 206/444, 45.15, 45, 206/45.16, 45.18, 45.14, 45.19; 74/98; 40/120, 124.1, 124

[56] References Cited

U.S. PATENT DOCUMENTS

| 191,087 | 5/1877 | Wells | 74/98 |
|---|---|---|---|
| 296,367 | 4/1884 | Toay | 206/45 |
| 480,045 | 8/1892 | Semmer | 206/45.18 |
| 1,335,397 | 3/1920 | Shawran et al. | 206/45 |
| 1,448,134 | 3/1923 | List | 206/45 |
| 2,112,551 | 3/1938 | Anderson | 206/45.16 |
| 2,316,070 | 4/1943 | Horton et al. | 74/98 |
| 2,503,833 | 4/1950 | Miller | 206/45.18 |
| 2,576,536 | 11/1951 | Raynaud | 74/98 |
| 2,720,438 | 10/1955 | Musick | 312/13 |
| 4,225,038 | 9/1980 | Egly | 206/45.18 |
| 4,356,918 | 11/1982 | Kahle et al. | 206/387 |
| 4,387,802 | 6/1983 | Shearing et al. | 206/45 |
| 4,478,335 | 10/1984 | Long et al. | 206/444 |
| 4,479,577 | 10/1984 | Eichner et al. | 206/444 |

FOREIGN PATENT DOCUMENTS

| 74729 | 3/1983 | European Pat. Appl. . |
| 471234 | 2/1929 | Fed. Rep. of Germany . |
| 681978 | 10/1939 | Fed. Rep. of Germany . |
| 2091219 | 7/1982 | United Kingdom ................ 206/387 |

Primary Examiner—William T. Dixson, Jr.
Assistant Examiner—Brenda J. Ehrhardt
Attorney, Agent, or Firm—Spensley Horn Jubas & Lubitz

[57] ABSTRACT

A storage container for storing planar packages, such a floppy disks, having a storage bin to which a front cover is pivotally attached so as to be rotatable outwardly and downwardly through an angle placing the front cover to the rear of the storage bin where it serves as a supporting base. Within the storage bin is disposed a wedge rotatably attached, and with an actuating lever, which, when rotated appropriately, causes planar packages stored in the storage bin to be raised into echelon display, enabling observation of information that may be present on the upper margins of the planar surfaces of the packages.

13 Claims, 4 Drawing Figures

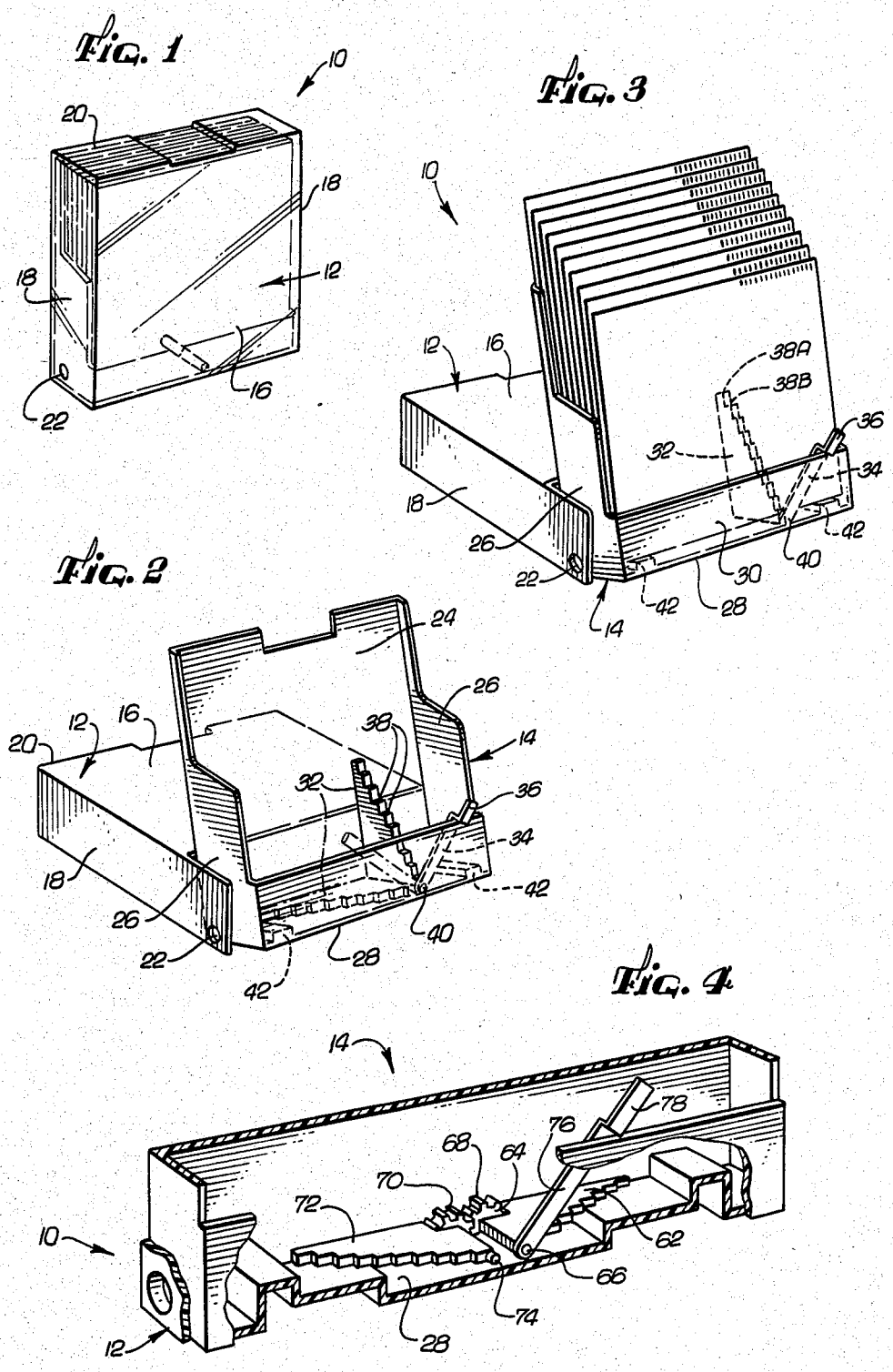

DISK STORAGE AND DISPLAY CONTAINER

BACKGROUND OF THE INVENTION

1. Field of the Invention

The present invention relates to a container for storing planar type disks, commonly known as floppy disks, and other similarly configured flat items which could require indexing, and more particularly to a container in which such disks may be stored and displayed in echelon arrangement.

2. Description of the Prior Art

Magnetic flexible disks, or floppy disks, have found increasing use in a variety of applications relating to computers. These disks are available in standard diameters of eight inches or five and one quarter inches, with each disk being enclosed within a square planar jacket. Disks having a diameter of less than five inches, or "diskettes", are also available. The jacket enclosed disks are typically stored in groups of ten in rectangular storage containers of a type which are well known in the art. One such storage container is disclosed in U.S. Pat. No. 4,356,918, issued to Kahle, et al.

Prior art disk storage containers have the common drawback that identification and selection of an individual disk from within the storage container is difficult. This is so because index information identifying the contents of each disk is typically displayed on the front surface of each disk jacket, typically on a narrow marginal strip located adjacent the upper edge of the jacket. When stacked together in a storage container, the edges of the jackets are aligned so that the index information on all but the foremost jacket is completely hidden from view. It is therefore necessary either to remove all of the disk jackets from the storage container, or to thumb through each disk jacket, in order to locate the desired one. This process is not only time consuming but may subject the disks to potential damage due to the bending of the disks which occurs during the search process.

An objective of the present invention is to provide a simple and practical container in which floppy disks may be compactly stored and also displayed so that the index information on each disk jacket is clearly visible, enabling quick and easy identification and retrieval of individual disks.

SUMMARY OF THE INVENTION

In accordance with the present invention, these and other objectives are achieved by providing a disk storage bin with a wedge rotably mounted in the base thereof. Rotation of the wedge raises the disks from a compact storage position to an echelon display position in which the index information on each disk jacket is clearly visible. The base of the disk storage bin, upon rotation about an axis through the lower rear portion of the disk storage bin, forms a cover to enclose the disk storage bin when the disks are in their stored positions.

BRIEF DESCRIPTION OF THE DRAWINGS

In the drawings, wherein like numerals refer to corresponding components in the several FIGUREs:

FIG. 1 is a perspective view of the container of the present invention in the storage position;

FIG. 2 is a perspective view of the container of the present invention in the display position;

FIG. 3 is a perspective view of the container of the present invention in the display position illustrating the echelon arrangement of the enclosed disks; and FIG. 4 is a perspective view of another embodiment of the container of the present invention.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention. The scope of the invention is best defined by the appended claims.

Referring to FIGS. 1 and 2, the storage container 10 of the present invention includes a base portion 12 and a bin portion 14.

The bin portion 14, in which the jacket-enclosed disks are retained, consists of a flat rectangular back cover 24 to which are attached sidewalls 26 and a floor 28. The sidewalls 26 are of a height sufficient to maintain the disk jackets in vertical alignment when in the display position. A front wall 30 is located along the front edge of the floor 28 and extends some distance up the edges of the sidewalls 26, thereby creating a bin or pouch in which the disk jackets are held. The base portion 12 consists of a flat rectangular front cover 16 to which are attached sidewalls 18 and a top wall 20.

The base portion 12 and bin portion 14 are hingibly connected through a pivot axis 22. The distance between sidewalls 26 of the bin portion 14 is slightly less than that between sidewalls 18 of the base portion 12. This enables the sidewalls 26 of the bin portion 14 to nest within the sidewalls 18 of the base portion 12 when the container 10 is closed in the storage position, as illustrated in FIG. 1.

The pivot axis 22 allows the base portion 12 to be rotated through an angle of slightly more than 270° with respect to the bin portion 14. When rotated through its maximum rotation, the base portion 12 may act as a support base for the bin portion 14, as shown in FIG. 2. In this position, the exposed edges of the sidewalls 18 and the top 20 rest upon a flat support surface, such as a table top (not shown). The back cover 24 rests at a slightly inclined angle against the bottom edge of the front cover 16.

Located within the bin portion 14 is a wedge 32. The wedge 32 is substantially in the shape of a right triangle, with one leg of the triangle being adjacent to the cover 24 of the bin portion 14 and the other leg of the triangle being adjacent to the floor 28 of the bin portion.

The hypotenuse of the triangular shaped wedge 32 is graded. In the preferred embodiment this grading takes the form of indentations or steps 38, with the number of steps 38 corresponding to the number of disks to be raised for display within the container 10. The height of each step corresponds to the amount of margin area of the planar surfaces of the disk jackets to be displayed when the disks are in the display position, and the width of each step 38 is sufficient to fully accommodate the thickness of one disk jacket.

A lever arm 34 is rigidly connected to the triangular wedge 32. The lever arm 34 extends from the floor 28 of the bin 14 and along the side of the front wall 30, and forming an angle of approximately thirty degrees with the plane of the wedge 32. The lever arm 34 terminates in a knob 36 which facilitates grasping and turning of the lever arm 34. The width of the knob 36 is no greater than the width of the top edge of the front wall 30. The knob 36 therefore does not interfere with closing the base portion 12.

The wedge 32 and lever arm 34 are both pivotable about a pivot axis 40 which runs from the front wall 30 to the back cover 24 of the bin portion 14. The pivot axis 40 allows for rotation of the wedge 32 through an angle of at least 90°, from a position in which the wedge 32 is parallel to the floor 28 of the bin portion 14 to a position in which the wedge 32 is perpendicular to the floor 28, as indicated by the dashed lines in FIG. 2.

One or more support members 42 are positioned parallel to and slightly above the floor 28 of the bin portion 14. In the storage position, the bottom edges of the disk jackets rest directly upon the support members 42, rather than the floor 28 of the bin portion 14. A small space is thereby created between the bottom of the disk jackets and the floor 28 of the bin portion, in which the wedge 32 may rest in the storage position.

To display the disks in echelon arrangement, the base portion 12 is rotated about the axis 22 into the position shown in FIG. 2. The lever arm 34 is then rotated about the axis 40 in a clockwise direction. Rotation of the lever arm 34 in turn causes the wedge 32 to rotate clockwise from its horizontal storage position to its vertical display position. Rotation of the wedge 32 lifts each of the disk jackets, the degree of lift depending upon the height of the step 38 on which each disk jacket rests. As shown in FIG. 3, in the display position the vertical position of the disk resting on step 38A will be slightly higher than that resting on step 38B. In the display position it will therefore be seen that the disks are displayed in echelon arrangement.

Another embodiment of the present invention is illustrated in FIG. 4. A wedge 62 is provided which is identical in all respects to the previously described wedge 32 but for the addition of a gear wheel 64 on wedge 62. The gear wheel 64 is concentric with the pivot axis 66 of the wedge 62 and has about its periphery a set of evenly spaced gear teeth 68.

The gear teeth 68 of the wedge 62 are configured to intermesh with the gear teeth 70 of an adjacent wedge 72. The wedge 72 is rotatable about a pivot axis 74 and its structure is the mirror image of the wedge 62. Wedges 62 and 72 are symmetric with respect to a plane which bisects the center of the container 10. In the embodiment of the invention illustrated in FIG. 4, the wedge 72 lacks a lever arm and knob corresponding to the lever arm 76 and knob 78 of the wedge 62.

In operation, the lever arm 76 may be rotated in a counter-clockwise direction to cause the wedge 62 and gear wheel 64 to likewise rotate about the axis 66 in a counter-clockwise direction. Interaction of the gear wheel 71 will cause the wedge 72 to rotate in a clockwise direction. The symmetric wedges 62 and 72 will thereby simultaneously move from a configuration in which they are parallel to the floor 28 of the bin portion 14 to a configuration in which they are both perpendicular to the floor 28. Any disk jackets resting upon the wedges 62 and 72 will thereby be raised from a storage position to a display position, with each wedge providing equal support to the disk jacket.

The present invention allows for a set of floppy disks or other similarly configured flat items to be stored in an arrangement which occupies no more space than that required by prior art storage units. However, whereas index information on disk jackets of disks stored in prior art units was not readable without manipulating and separating the individual disks themselves, it is possible in the present invention to clearly observe the index information on each of the disk jackets without manually thumbing through the disks.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A container for storing disk-containing jackets and for selectively displaying identifying indicia on the top marginal portions of said jackets, comprising:

a bottom wall, opposed side walls and opposed front and rear walls defining a storage chamber for the disk-containing jackets;

a support surface disposed in said storage chamber for supporting disk-containing jackets above said bottom wall;

said support surface and said bottom wall defining a compartment therebetween;

a display actuator member rotatably mounted in said compartment so as to be rotatable between a lowered position and a raised position;

said display actuator member having a series of steps provided thereon, each of said steps being adapted to engage the bottom edge of a disk-containing jacket and to raise such jacket to a display position upon rotation of said display actuator member from its lowered position to its raised position, whereby rotation of said display actuator member from its lowered position to its raised position will raise disk-containing jackets in said storage chamber into a stepped array with the top marginal portion of each jacket extending above the top edge of the jacket in front of it so as to display identifying indicia and thereby facilitate selection and removal of any desired disk; and manually operable means connected to said display actuator member for rotating said display actuator member between its lowered and raised positions.

2. A container according to claim 1, wherein said manually operable means comprises a lever connected to said display actuator member and having at least a portion thereof exposed for manual access proximate said front wall of said container.

3. A container according to claim 1, wherein said display actuator member comprises a first display actuator member, and further comprising a second display actuator member rotatably mounted in said container; and gear means operatively connected between said first and second display actuator members so that said second display actuator member will be rotated when said first display actuator member is rotated.

4. A container according to claim 3, wherein said second display actuator member has a series of steps provided thereon for engaging the bottom edges of disk-containing jackets and raising such jackets to a display position upon rotation thereof.

5. A container for storing disk-containing jackets and for selectively displaying identifying indicia on the top marginal portions of said jackets, comprising:

a bottom wall, opposed side walls and opposed front and rear walls defining a storage chamber for the disk-containing jackets;

first and second display actuator members rotatably mounted proximate said bottom wall so as to be rotatable between lowered positions and raised positions;

each of said display actuator members having a series of steps provided thereon, each of said steps being adapted to engage the bottom edge of a disk-containing jacket and to raise such jacket to a display position upon rotation thereof from its lowered position to its raised position, whereby rotation of said display actuator member from its lowered position to its raised position will raise disk-containing jackets in said storage chamber into a stepped array with the top marginal portion of each jacket extending above the top edge of the jacket in front of it so as to display identifying indicia on all of said jackets and thereby facilitate selection and removal of any desired disk;

manually operable means connected to said first display actuator member for rotating said first display actuator member between its lowered and raised positions; and gear means operatively connected between said first and second display actuator members so that said second display actuator member will be rotated when said first display actuator member is rotated.

6. A container according to claim 5, wherein said manually operable means comprises a lever connected to said first display actuator member and having at least a portion thereof exposed for manual access proximate said front wall of said container.

7. A container for storing generally planar members and for selectively displaying identifying indicia on the top marginal portions of said members, comprising:

a bottom wall, opposed side walls and opposed front and rear walls defining a storage chamber for the generally planar members;

a display actuator member rotatably mounted adjacent said bottom wall;

said display actuator member having a plurality of cam means thereon, each of said cam means being adapted to raise one of said generally planar members to a display position upon rotation of said display actuator member, whereby rotation of said display actuator member will raise at least one of said generally planar members to a position wherein the top marginal portion of said member will extend above the top edge of the member in front of it so as to display identifying indicia thereon; and manually operable means connected to said display actuator member for selectively rotating said display actuator member.

8. A container according to claim 7, wherein said display actuator member comprises a member having a plurality of steps thereon, said steps comprising said cam means, whereby rotation of said display actuator member will raise said generally planar members to their display positions substantially simultaneously.

9. A container according to claim 7, wherein said cam means on said display actuator member are arranged so as to raise said generally planar members to their respective display positions substantially simultaneously upon rotation of said display actuator member.

10. A container according to claim 7, and further comprising a support surface disposed in said storage chamber for supporting said generally planar members above said bottom wall;

said support surface and said bottom wall defining a compartment therebetween; and said display actuator member being rotatable between a lowered position wherein it is disposed substantially entirely within said compartment and a raised position wherein said cam means extend above said support surface.

11. A container according to claim 7, wherein said display actuator member comprises a generally wedge-shaped member in the form of a right triangle having a hypotenuse, and wherein said cam means comprise steps formed along said hypotenuse.

12. In a container for storing disk-containing jackets, said container comprising a bottom wall, opposed side walls and opposed front and rear walls defining a storage chamber for the disk-containing jackets; and a cover member rotatably attached to said container, said cover member being rotatable between a closed position wherein said container and said cover member substantially enclose disk-containing jackets stored therein and an open position wherein said cover member functions as a support stand for supporting said container in a generally vertical position with the upper portions of said disk-containing jackets extending through the open upper end of said container; the improvement comprising:

a display actuator member for selectively raising disk-containing jackets in the container to a display position wherein identifying indicia on the top marginal portions of said jackets will be displayed to facilitate selection and removal of any desired disk; said display actuator member being rotatably mounted in said container so as to be rotatable between a lowered position and a raised position;

said display actuator member having a series of steps provided thereon, each of said steps being adapted to engage the bottom edge of a disk-containing jacket and to raise such jacket to a display position upon rotation of said display actuator member from its lowered position to its raised position, whereby rotation of said display actuator member from its lowered position to its raised position will raise disk-containing jackets in said storage chamber into a stepped array with the top marginal portion of each jacket extending above the top edge of the jacket in front of it so as to display identifying indicia on said jackets; and manually operable means connected to said display actuator member for rotating said display actuator member between its lowered and raised positions.

13. A container according to claim 12, and further comprising a support surface disposed in said storage chamber for supporting disk-containing jackets above said bottom wall; said support surface and said bottom wall defining a compartment therebetween; said display actuator member being rotatably mounted in said compartment.

* * * * *